(12) United States Patent
Yatabe

(10) Patent No.: US 7,549,711 B2
(45) Date of Patent: Jun. 23, 2009

(54) VACUUM PRESSURE BOOSTER

(75) Inventor: Shuuichi Yatabe, Nagano-ken (JP)

(73) Assignee: Nissin Kogyo Co., Ltd., Nagano-ken (JP)

( * ) Notice: Subject to any disclaimer, the term of this patent is extended or adjusted under 35 U.S.C. 154(b) by 812 days.

(21) Appl. No.: 10/600,834

(22) Filed: Jun. 23, 2003

(65) Prior Publication Data

US 2004/0050634 A1 Mar. 18, 2004

(30) Foreign Application Priority Data

Jun. 21, 2002 (JP) ............ P. 2002-180851

(51) Int. Cl.
*B60T 8/44* (2006.01)
(52) U.S. Cl. .............. 303/114.3; 188/356; 188/357
(58) Field of Classification Search .......... 303/114.3, 303/115.3; 188/356, 357; 91/376 R, 369.1, 91/369.2, 369.3
See application file for complete search history.

(56) References Cited

U.S. PATENT DOCUMENTS

| 4,633,760 A | * | 1/1987 | Wagner | 91/369.2 |
|---|---|---|---|---|
| 5,190,125 A | * | 3/1993 | Suzuki et al. | 188/357 |
| 5,431,090 A | * | 7/1995 | Shinohara et al. | 92/128 |
| 5,611,257 A | | 3/1997 | Eick | |
| 2002/0069751 A1 | * | 6/2002 | Inoue et al. | 91/376 R |
| 2002/0073834 A1 | * | 6/2002 | Shinohara | 91/376 R |

FOREIGN PATENT DOCUMENTS

| GB | 2 320 539 | * | 6/1998 |
|---|---|---|---|
| JP | 58-48923 | | 11/1983 |
| JP | 3-108554 | | 11/1991 |
| JP | 8-011704 | | 1/1996 |
| JP | 2001-213303 | * | 8/2001 |

* cited by examiner

*Primary Examiner*—Bradley T King
(74) *Attorney, Agent, or Firm*—Greenblum & Bernstein, P.L.C.

(57) ABSTRACT

A vacuum pressure booster has a booster shell; a booster piston; a valve cylinder including: a valve piston; an input rod; a control valve; and an input return spring, and the control valve including: an annular vacuum pressure introducing valve seat; an atmosphere introducing valve seat; a valve body including: an annular attaching bead portion; an expansion cylinder portion; and an annular valve portion; and a valve spring, wherein the attaching bead portion is tightly held by a pair of cylindrical holding portions formed in a pair of valve holders attached to the valve cylinder, and the diameter of the holding portion is smaller than the inner diameter of the valve cylinder.

21 Claims, 6 Drawing Sheets

VACUUM PRESSURE BOOSTER

BACKGROUND OF THE INVENTION

1. Field of the Invention

The present invention relates to a vacuum pressure booster used for the boosting operation of a master cylinder of a brake of a vehicle. More particularly, the present invention relates to improvements in a vacuum pressure booster having: a booster shell; a booster piston accommodated inside the booster shall and partitioning the interior of the booster shell into a front side vacuum pressure chamber communicating with a vacuum pressure source and a rear side operation chamber; a valve cylinder communicating with the booster piston.

The valve cylinder includes: a valve piston fitted into the valve cylinder to be slidable in a forward and rearward direction of the valve cylinder; an input rod coupling with the valve piston at a front end thereof; a control valve switching communication of the operation chamber with the vacuum pressure chamber and with air in accordance with a forward and rearward movement of the input rod between the valve piston and the valve cylinder; and an input return spring for pushing the input rod backward.

The control valve includes: an annular vacuum pressure introducing valve seat formed in the valve cylinder; an atmosphere introducing valve seat formed in the valve piston and arranged inside the vacuum pressure introducing valve seat; a valve body including: an annular attaching bead portion airtightly attached to the valve cylinder; an expansion cylinder portion extending in the axial direction from the attaching bead portion; and an annular valve portion communicating with a forward end portion of the expansion cylinder portion and opposed to the vacuum pressure introducing valve seat and the atmosphere introducing valve seat so as to seat thereon; and a valve spring for pushing the valve portion so as to seat on the vacuum pressure introducing valve seat and the atmosphere introducing valve seat.

A first port communicates with the vacuum pressure chamber is opened on the outer circumferential side of the vacuum pressure introducing valve seat, a second port communicates with the operation chamber is opened between the vacuum pressure introducing valve seat and the atmosphere introducing valve seat in such a manner that the inner circumferential side of the valve portion is communicated with the atmosphere.

2. Description of the Related Art

The above vacuum pressure booster has already been well known as disclosed, for example, in JP-UM-B-58-48923.

In the above conventional vacuum pressure booster, when an attaching bead portion of the valve body is attached to the valve cylinder, the attaching bead portion is tightly engaged on an inner circumferential face of the valve cylinder, and an annular valve holder is tightly engaged on an inner circumferential face of the bead portion. Therefore, it is impossible for a diameter of the attaching bead portion to be smaller than the inner diameter of the valve cylinder. However, when consideration is given to the airtightness of the attaching portion of the bead portion, it is preferable that the diameter of the attaching bead portion is reduced as small as possible so that the attaching area can be reduced.

SUMMARY OF THE INVENTION

The present invention has been accomplished in view of the above circumstances. It is an object of the present invention to provide a vacuum pressure booster that, while a diameter of the attaching bead portion of the valve body is made to be smaller than the inner diameter of the valve cylinder, the bead portion can be airtightly attached to the valve cylinder.

According to the first aspect of the present invention, there is provided a vacuum pressure booster has: a booster shell; a booster piston accommodated inside the booster shall and partitioning the interior of the booster shell into a front side vacuum pressure chamber communicating with a vacuum pressure source and a rear side operation chamber; a valve cylinder communicating with the booster piston, the valve cylinder including: a valve piston fitted into the valve cylinder to be slidable in a forward and rearward direction of the valve cylinder; an input rod coupling with the valve piston at a front end thereof; a control valve switching communication of the operation chamber with the vacuum pressure chamber and with air in accordance with a forward and rearward movement of the input rod between the valve piston and the valve cylinder; and an input return spring for pushing the input rod backward, and the control valve including: an annular vacuum pressure introducing valve seat formed in the valve cylinder; an atmosphere introducing valve seat formed in the valve piston and arranged inside the vacuum pressure introducing valve seat; a valve body including: an annular attaching bead portion airtightly attached to the valve cylinder; an expansion cylinder portion extending in the axial direction from the attaching bead portion; and an annular valve portion communicating with a forward end portion of the expansion cylinder portion and opposed to the vacuum pressure introducing valve seat and the atmosphere introducing valve seat so as to seat thereon; and a valve spring for pushing the valve portion so as to seat on the vacuum pressure introducing valve seat and the atmosphere introducing valve seat, wherein a first port communicating with the vacuum pressure chamber is opened on the outer circumferential side of the vacuum pressure introducing valve seat, a second port communicating with the operation chamber is opened between the vacuum pressure introducing valve seat and the atmosphere introducing valve seat in such a manner that the inner circumferential side of the valve portion is communicated with the atmosphere, the attaching bead portion is tightly held by a pair of cylindrical holding portions formed in a pair of valve holders attached to the valve cylinder, and the diameter of the holding portion is smaller than the inner diameter of the valve cylinder.

According to the above first aspect, the diameter of the attaching bead portion of the valve body can be smaller than the inner diameter of the valve cylinder in the same manner as that of the valve portion. Therefore, an attaching area of the attaching bead portion can be made as small as possible and the airtightness can be enhanced. When the diameter of the attaching bead portion is reduced to be a size smaller than the inner diameter of the valve cylinder in the same manner as that of the valve portion, the length of the expansion cylinder portion of the valve body can be shortened and the valve body can be made compact.

In addition to the first aspect, according to the second aspect of the present invention, there is provided a vacuum pressure booster, wherein at least one of the pair of valve holders is engaged on the inner circumferential face of the valve cylinder through a seal member.

According to the above second aspect, it is possible to ensure.the airtightness between a pair of valve holders and the valve cylinder. The attaching portion of the attaching bead portion has a high airtightness., and further a leakage of the atmosphere and vacuum pressure from the periphery of the attaching bead portion can be positively prevented.

In addition to the first or the second aspect, according to the third aspect of the present invention, there is provided wherein a cylindrical connecting portion engaging with an outer circumferential face of one valve holder having the holding portion for holding an inner circumferential face of the attaching bead portion is integrally formed in the other valve holder having the holding portion for holding an outer circumferential face of the attaching bead portion.

According to the above third aspect, while the attaching bead portion is being held between the holding portions of the pair of valve holders, the connecting portion of one valve holder is engaged on the outer circumferential face of the other valve holder. Due to the foregoing, a small assembling body including three components of both the valve holders and the valve body is composed. When this small assembling body is inserted into the valve cylinder, the control valve-can be easily assembled, that is, the assembling property can be enhanced.

In addition to the third aspect, according to the fourth aspect of the present invention, there is provided a vacuum pressure booster, wherein a recessing and a protruding portion elastically engaged with each other are formed on respective engaging faces between the pair of valve holders.

According to the above fourth aspect, when the pair of valve holders are engaged with each other, the recessing and the protruding portion are automatically engaged with each other, so that both the holders can be connected. Therefore, the small assembling body including the three components can be easily composed. Accordingly, the assembling property can be further enhanced.

In addition to one of the first to the fourth aspect, according to the fifth aspect of the present invention, there is provided a vacuum pressure booster, wherein the valve portion is slidably fitted on the inner circumferential face of the valve cylinder, a forward annular chamber and a rear annular chamber are formed in the valve cylinder, the forward annular chamber is communicated with the first port and the rear annular chamber is communicated with the second port, a forward annular chamber is closed by the front face of the valve portion when the valve portion is seated on the vacuum pressure introducing valve seat, and a back face of the valve portion is facing to a rear annular chamber.

According to the above fifth aspect, the input rod is advanced while resisting a set load of the input return spring, and the atmosphere introducing valve seat is separated from the valve portion of the valve body, and when the valve portion is seated on the vacuum pressure introducing valve seat, the vacuum pressure transmitted from the first port to the forward annular chamber acts on the front face of the valve portion facing the forward annular chamber. On the other hand, on the back face of the valve portion facing the rear annular chamber of the valve cylinder, the atmospheric pressure transmitted from the second port to the rear annular chamber acts. Therefore, the valve portion is pushed to a valve seating direction so as to seat on the vacuum pressure introducing valve seat by not only the set load of the valve spring but also a difference in the atmosphere between the front portion and the rear annular chamber. Therefore, the set load of the valve spring can be reduced by an intensity of the pushing force generated by the above difference in the atmospheric pressure. According to that, it is possible to reduce the set load of the input return spring to push the input rod backward. Therefore, the initial operation load of the input rod can be reduced.

DETAILED DESCRIPTION OF THE PREFERRED EMBODIMENTS

An embodiment of the present invention will be explained referring to the accompanying drawings.

Figure 1:
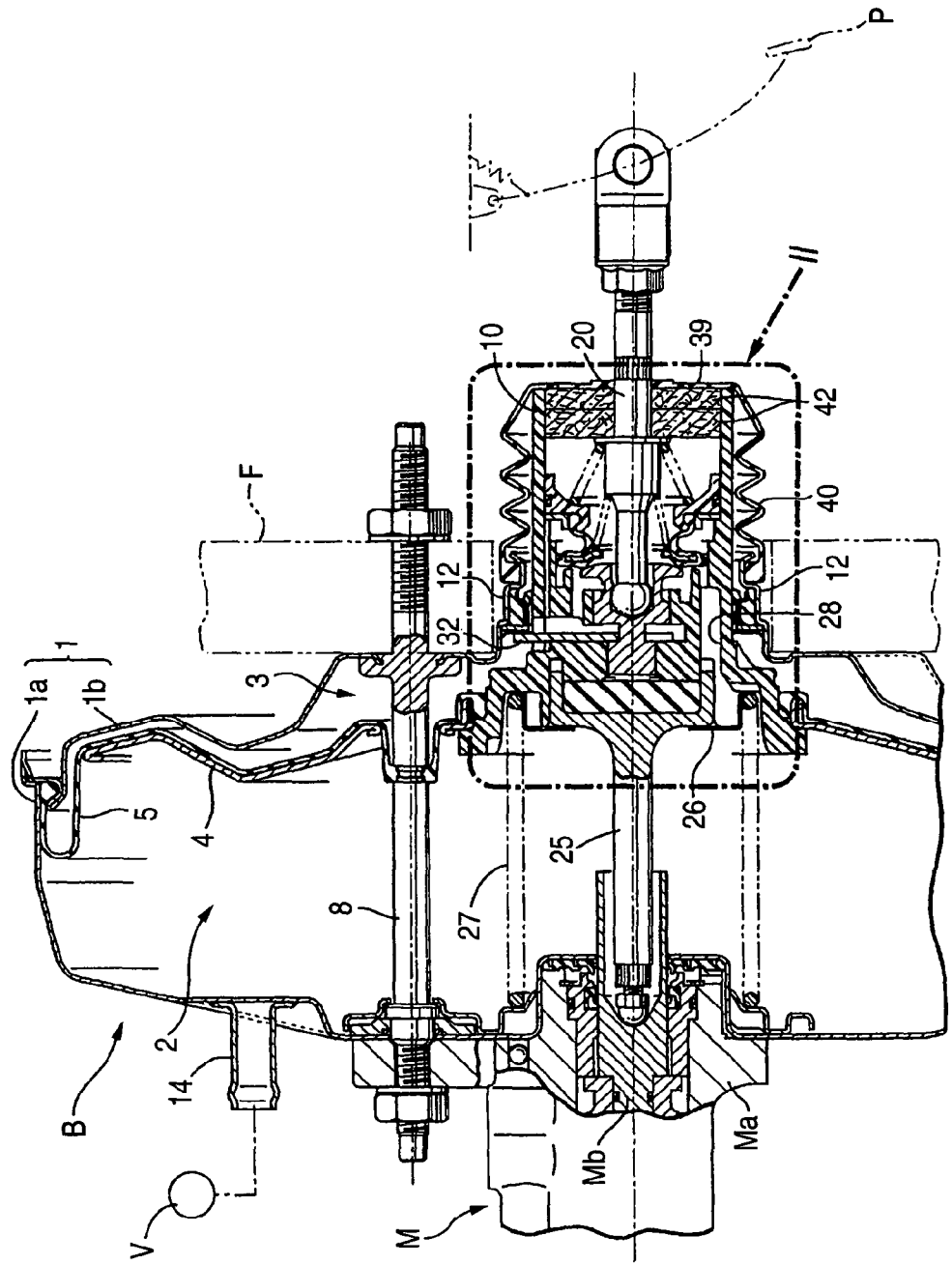
FIG. 1 is a longitudinally sectional view of a single type vacuum pressure booster of the present invention, wherein the view shows a state in which an input rod is in recess.
Figure 2:
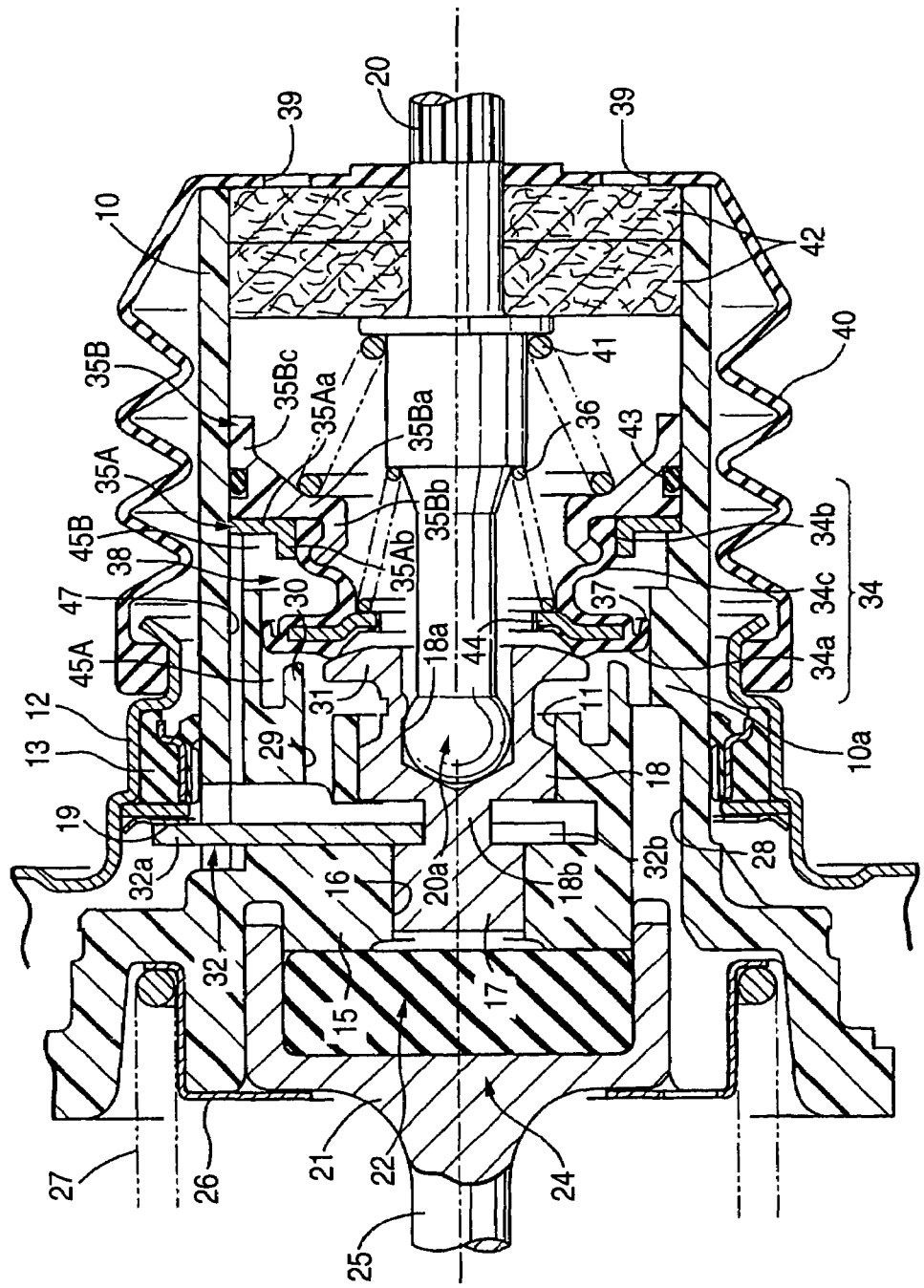
FIG. 2 is an enlarged view of the portion II in FIG. 1.
Figure 3:
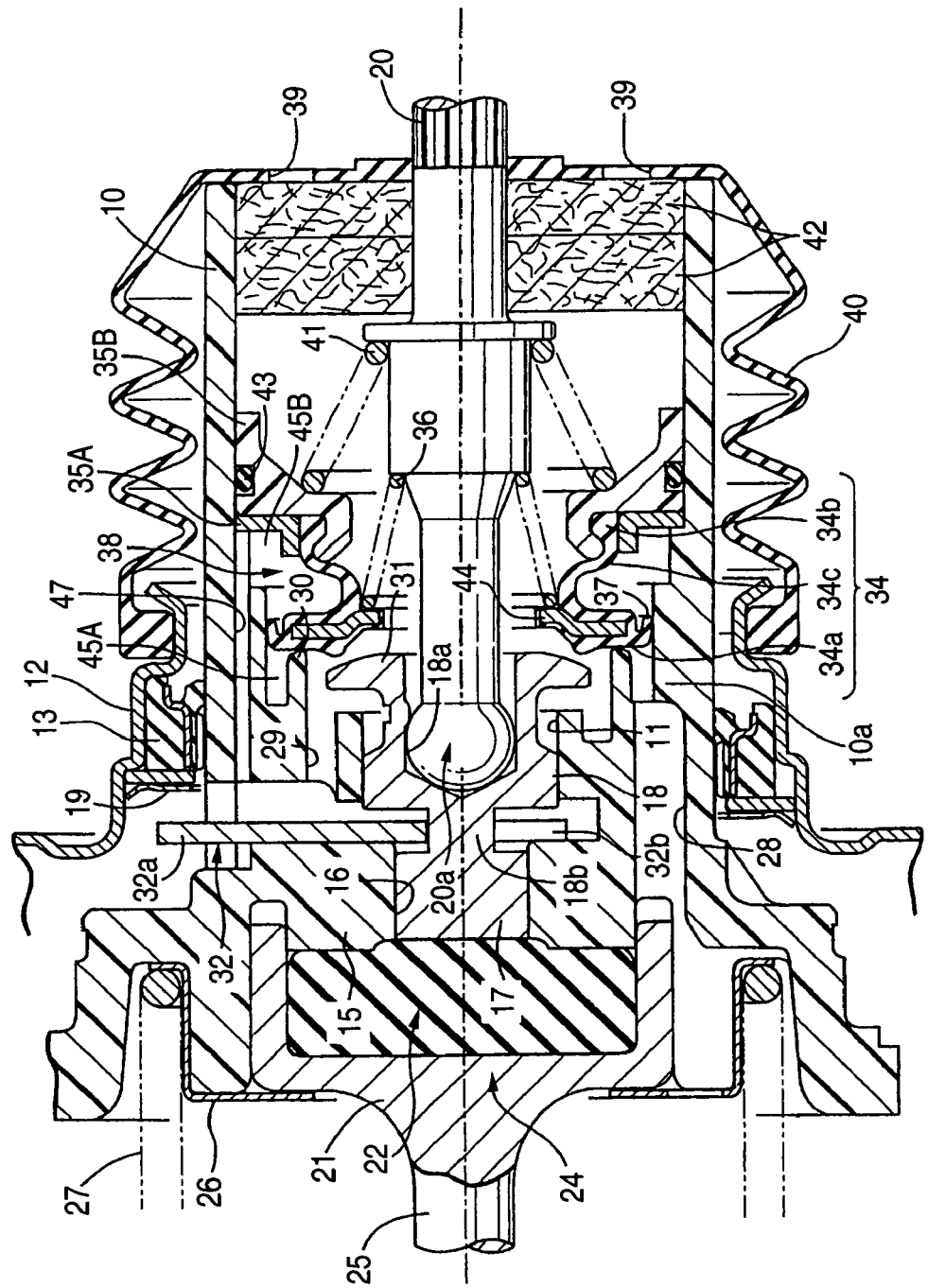
FIG. 3 is a schematic illustration for explaining a boosting action corresponding to FIG. 2.
Figure 4:
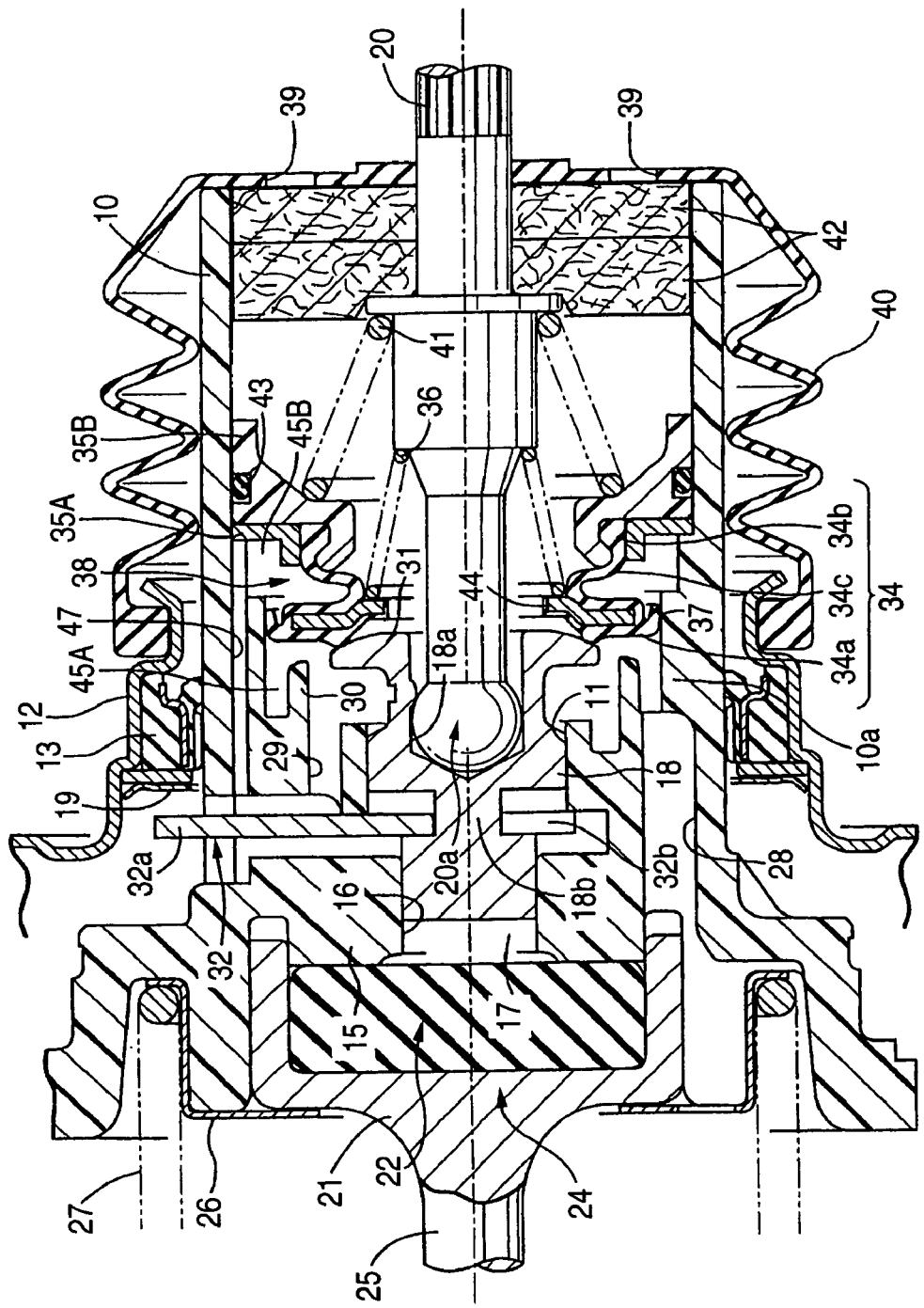
FIG. 4 is a schematic illustration for explaining the process of a boosting releasing action corresponding to FIG. 2.
Figure 5:
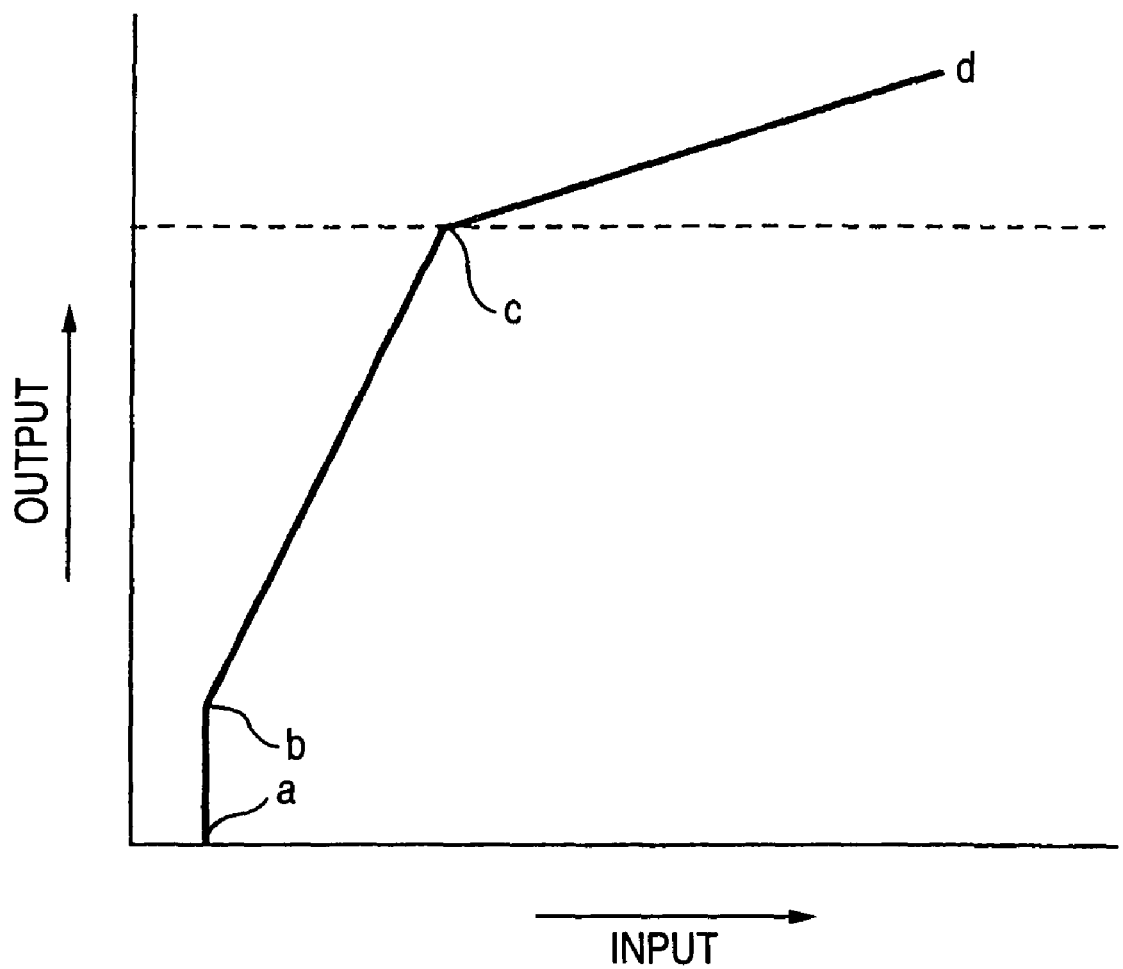
FIG. 5 is a characteristic diagram of the boosting force of the vacuum pressure booster; and, FIG. 6 is a sectional view showing the second embodiment of the present invention corresponding to FIG. 2.
Figure 6:
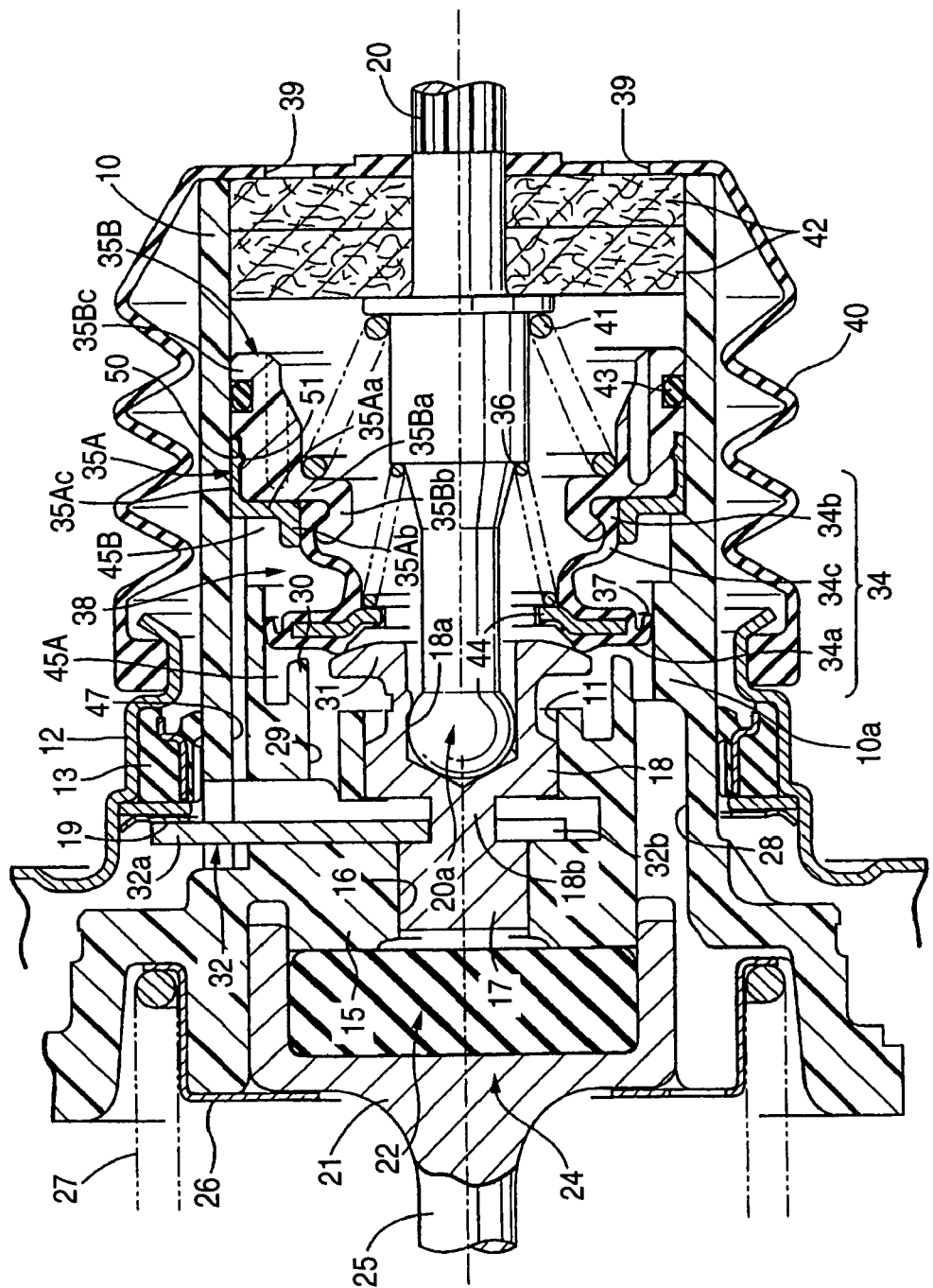

FIG. 1 is a longitudinally sectional view of a single type vacuum pressure booster of the first embodiment of the present invention, wherein the view shows a state in which an input rod is in recess. FIG. 2 is an enlarged view of the portion 2 shown in FIG. 1. FIG. 3 is a schematic illustration for explaining a boosting action corresponding to FIG. 2. FIG. 4 is a schematic illustration for explaining the process of a boosting releasing action corresponding to FIG. 2. FIG. 5 is a characteristic diagram of the boosting force of the vacuum pressure booster. FIG. 6 is a sectional view showing the second embodiment of the present invention corresponding to FIG. 2.

First of all, the explanation of the first embodiment of the present invention will start here. In FIGS. 1 and 2, the booster shell 1 of the vacuum pressure booster B is composed of a pair of half shell bodies 1a, 1b, the opposed end portions of which are connected with each other. Both half shell bodies 1a, 1b are connected with each other by a plurality of tie rods 8 (Only one of them is shown in FIG. 1.) which penetrate them. The rear half shell body 1b is fixed to the front wall F of the vehicle chamber through the above tie rods 8, and the cylinder body Ma of the brake master cylinder M is fixed to the front half shell body 1a.

The inside of the booster shell 1 is partitioned into. the front side vacuum pressure chamber 2 and the rear side operation chamber 3 by the booster piston 4, which is accommodated in the booster shell 1 in such a manner that the booster piston 4 can be slid and reciprocated in the longitudinal direction, and also partitioned by the diaphragm 5 attached to the rear face of the booster piston 4 and interposed between the front side vacuum pressure chamber 2 and the rear side operation chamber 3. The vacuum pressure chamber 2 is connected with the vacuum pressure source V (for example, the inside of the intake manifold of an internal combustion engine) through the vacuum pressure introducing pipe 14.

The above tie rods 8 also penetrate the booster piston 4 and the diaphragm 5. The diaphragm 5 is connected with the tie rods 8 so that the airtightness between the vacuum pressure chamber 2 and the operation chamber 3 can be ensured while the movement of the booster piston 4 is being allowed.

The booster piston 4 is made of a steel plate and formed into an annular profile. The valve cylinder 10 made of synthetic resin is integrally connected with the center of the booster piston 4 and the diaphragm 5. This valve cylinder 10 is slidably supported by the support cylinder portion 12, which protrudes backward at the center of the rear half shell 1b, through the bearing member 13 having a seal lip.

In the valve cylinder 10, there are provided a valve piston 18, an input rod 20 connecting with the valve piston 18, and a control valve 38 for changing over the operation chamber 3 between the communication with the vacuum pressure chamber 2 and the communication with the atmosphere.

The valve piston 18 is slidably engaged in the guide hole 11 provided in the valve cylinder 10. At the forward end of the valve piston 18, there is provided a reaction force piston 17 through the neck portion 18b, and at the rear end of the valve piston 18, there is provided a flange-shaped atmosphere introducing valve seat 31. The annular vacuum pressure introducing valve seat 30, which is concentrically arranged in such a manner that the annular vacuum pressure introducing valve seat 30 surrounds the atmosphere introducing valve seat 31, is formed in the valve cylinder 10.

In the valve piston 18, there is provided a connecting hole 18a which is open to the rear end face of the atmosphere introducing valve seat 31. The spherical front end portion 20a of the input rod 20 is engaged in this connecting hole 18a. In order to prevent the spherical front end portion 20a of the input rod 20 from dropping out, one portion of the valve piston 18 is calked. In this way, the input rod 20 is oscillatingly connected to the valve piston 18.

One common valve body 34, which operates in cooperation with the vacuum pressure introducing valve seat 30 and the atmosphere introducing valve seat 31, is attached to the valve cylinder 10. The entire valve body 34 is made of elastic material such as rubber and includes: an annular attaching bead portion 34b; an expansion cylinder portion 34c which expending forward from the attaching bead portion 34b; and a flange-shaped valve portion 34a which extends from the front end of the expansion cylinder portion 34c to the outside in the radial direction. The annular reinforcing plate 44 is inserted from the inner circumferential side into the valve portion 34a and joined by means of molding. On the outer circumference of the valve portion 34a, the annular seal lip 37 bending backward is integrally formed.

The attaching bead portion 34b is airtightly held between a pair of the valve holders 35A, 35B, which come into contact with the rear end of the annular rising portion 10a integrally formed on the inner circumferential side of the valve cylinder 10 together with the vacuum pressure introducing valve seat 30, as follows. The front valve holder 35A is made of synthetic resin and includes: an annular flange portion 35Aa contacting with the rear end of the annular rising portion 10a while engaging with the inner circumferential face of the valve cylinder 10; and a cylindrical holding portion 35Ab which is bent forward at the inner circumferential edge of the flange portion 35Aa. The rear valve holder 35B is also made of synthetic resin and includes: a cylindrical engaging portion 35Bc engaged with the inner circumferential face of the valve cylinder 10 being arranged at the rear of the flange portion 35Aa of the front valve holder 35A; a flange portion 35Ba which is bent inward in the radial direction at the front end of the engaging portion 35Bc; and a cylindrical holding portion 35Bb surrounded by the holding portion 35Ab being bent forward at the inner circumferential edge of the flange portion 35Ba. Accordingly, both the holding portions 35Ab, 35Bb are smaller than the valve cylinder 10 in diameter. The attaching bead portion 34b is tightly held by these holding-portions 35Ab, 35Bb.

The inner circumferential face of the holding portion 35Ab of the front valve holder 35A is formed flat corresponding to the flat outer circumferential face of the attaching bead portion 34b The outer circumferential face of the holding portion 35Bb of the rear valve holder 35B is formed into a recess-shape corresponding to the protruding shape of the inner circumferential face of the attaching bead portion 34b. In the assembling process, first, the attaching bead portion 34b is held between both the holding portions 35Ab, 35Bb, and in this state, both the valve holders 35A, 35B are engaged in the valve cylinder 10. After the engagement, it is possible to prevent the attaching bead portion 34b from dropping out from between both the holding portions 35Ab, 35Bb.

The seal member 43 such as an O-ring, which tightly comes into contact with the inner circumferential face of the valve cylinder 10, is attached to the engaging portion 35Bc of the rear valve holder 35B.

The valve portion 34a is arranged being opposed so as to seat on the atmosphere introducing valve seat 31 and the vacuum pressure introducing valve seat 30. Between the reinforcing plate 44 of the valve portion 34a and the input rod 20, there is provided a valve spring 36 for pushing the valve portion 34a in a direction so that the valve portion 34a can be seated on both the valve seats 30, 31. The control valve 38 is composed of the above vacuum pressure introducing valve seat 30, atmosphere introducing valve seat 31, valve body 34 and valve spring 36.

Between the rear valve holder 35B and the input rod 20, there is provided an input return spring 41 being compressed. By this input return spring 41, the front and the rear valve holder 35A, 35B are contacted with and held by the rear end portion of the annular rising portion 10a of the valve cylinder 10, and at the same time, the input rod 20 is pushed backward.

In the annular rising portion 10a of the valve cylinder 10, there is provided a front annular chamber 45A surrounding the vacuum pressure introducing valve seat 30, and the front face of the valve portion 34a faces the front annular chamber 45A. The inner circumferential face on the outside in the radial direction of the front annular chamber 45A extends backward compared with the vacuum pressure introducing valve seat 30, and the seal lip 37 of the outer circumference of the valve portion 34a slidably comes into contact with the inner circumferential face. Accordingly, the front annular chamber 45A is closed when the valve portion 34a is seated on the vacuum pressure introducing valve seat 30.

Inside the annular rising portion 10a, the rear annular chamber 45B, which the back face of the-valve portion 34a is facing, is defined by the valve portion 34a having the seal lip 37.

In the valve cylinder 10, there are provided a first and a second port 28, 29. The first port 28 is composed so that one end is open to the vacuum pressure chamber 2 and the other end is open to the front annular chamber 45A. The second port 29 is composed so that one end is open to the operation chamber 3 and the other end is open to between the vacuum pressure introducing valve seat 30 and the atmosphere introducing valve seat 31. This second port 29 is communicated with the rear annular chamber 45B through the communicating hole 47 which is parallel with the axis of the valve cylinder 10 formed at the root of the annular rising portion 10a. The communicating hole 47, which is parallel with the axis of the valve cylinder 10, can be simply formed by using a core pin in the process of forming the valve cylinder 10.

Both end portions of the boot 40 capable of expanding and contracting, which covers the valve cylinder 10, are attached to the rear end portion of the support cylinder 12 of the rear half shell body 1b and the input rod 20. The atmosphere introducing port 39 communicating with the inside of the valve body 34 is provided at the rear end portion of this boot 40. The filter 42 for filtering the air flowing into this atmosphere introducing port 39 is arranged between the outer circumferential face of the input rod 20 and the inner circumferential face of the valve cylinder 10. This filter 42 is flexible so that a relative movement conducted between the input rod 20 and the valve cylinder 10 can not be obstructed.

In this valve cylinder 10, there is provided a key 32 for regulating the limit of the backward motion of the booster piston 4 and the valve piston 18 in such a manner that the key 32 can be moved in the axial direction in a predetermined range of distance. This key 32 has a fork portion 32b at the inner end striding over the neck portion 18b between the valve piston 18 and the reaction force piston 17, and the outer end 32a of the key 32 is arranged being opposed to a front face of the stopper wall 19 provided in the support cylinder portion 12 of the rear half shell body 1b. When the key 32 comes into contact with the stopper wall 19, the limit of the backward motion of the booster piston 4 and the valve cylinder 10 is regulated. When the rear end face of the reaction force piston 17 comes into contact with the key 32, the limit of the backward motion of the valve piston 18 and the input rod 20 is regulated. The length of the neck portion 18b in the axial direction is set to be larger than the wall thickness of the key 32. Therefore, the valve piston 18 and the key 32 can be a little moved relatively.

In the valve cylinder 10, there are provided an operation piston 15 protruding forward and a small diameter cylinder hole 16 penetrating the center of this operation piston 15. In this small diameter cylinder hole 16, the reaction force piston 17 is slidably engaged. With the outer circumference of the operation piston 15, the cup body 21 is slidably engaged. The flat elastic piston 22, which is opposed to the operation piston 15 and the reaction force piston 17, is charged in this cup body 21. In this case, between the reaction force piston 17 and the elastic piston 22, a predetermined clearance is formed when the vacuum pressure booster B is not operated.

The output rod 25 is protruded to the front face of the cup body 21. This output rod 25 is connected with the piston Mb of the brake master cylinder M.

In the above structure, the operation piston 15, reaction force piston 17, elastic piston 22 and cup body 21 compose a reaction force mechanism 24 which feeds back a portion of the output of the output rod 25 to the input rod 20.

On the front end face of the cup body 21 and the valve cylinder 10, there is provided a retainer 26. Between this retainer 26 and the front wall of the booster shell 1, there is provided a booster return spring 27 for pushing the booster piston 4 and the valve cylinder 10 backward. This booster return spring 27 is arranged being compressed.

Next, operation of this embodiment will be explained below.

When the vacuum pressure booster B is in a recess state, as shown in FIGS. 1 and 2, the key 32 attached to the valve cylinder 10 comes into contact with the front face of the stopper wall 19 of the rear half shell body 1b. When the rear end face of the reaction force piston 17 comes into contact with this key 32, the booster piston 4 and the input rod 20 are located at the limit of the backward motion. At this time, while the atmosphere introducing valve seat 31 is tightly contacting with the valve portion 34a of the valve body 34, the atmosphere introducing valve seat 31 pushes the valve portion 34a, so that the valve portion 34a is a little separated from the vacuum pressure introducing valve seat 30. Due to the foregoing, the communication between the atmosphere introducing port 39 and the second port 29 is shut off. On the other hand, the communication between the first and the second port 28, 29 is attained. Accordingly, the vacuum pressure in the vacuum pressure chamber 2 is transmitted to the operation chamber 3 through both the ports 28, 29, and the pressure in both the chambers 2, 3 becomes the same. Therefore, the booster piston 4 and the valve cylinder 10 are maintained at the backward position by a pushing force generated by the booster return spring 27.

In order to brake a vehicle, a driver puts on the brake pedal P, and the input rod 20 is advanced together with the valve piston 18 resisting a set load of the input return spring 41. Then, operation is conducted as follows. As shown in FIG. 3, while a pushing force of the valve spring 36 is extending the expanding cylinder-portion 34c, the valve portion 34a is seated on the vacuum pressure introducing valve seat 30, and the atmosphere introducing valve seat 31 is separated from the valve body 34. Due to the foregoing, the communication between the first and the second port 28, 29 is shut off, and the second port 29 is communicated with the atmosphere introducing port 39 through the inside of the valve body 34.

As a result, the atmosphere flowing into the valve cylinder 10 from the atmosphere introducing port 39 passes through the atmosphere introducing valve seat 31 and flows into the operation chamber 3 through the second port 29, so that the pressure in the operation chamber 3 is increased higher than the pressure in the vacuum pressure chamber 2. Therefore, a forward thrust is generated by the difference in pressure. Accordingly, the booster piston 4 is advanced, resisting a spring force of the booster return spring 27, together with the valve cylinder 10, operation piston 15, elastic piston 22, cup body 21 and output rod 25. In this way, the output rod 25 drives the piston Mb of the brake master cylinder M. The elastic piston 22 is compressed by a reaction force generated by this driving motion, and a portion of the elastic piston 22 is expanded into the small cylinder hole 16. However, until the expanded portion comes into contact with the front face of the reaction force piston 17, the aforementioned reaction force is not transmitted to the input rod 20. Therefore, the output of the output rod 25 has a jumping characteristic in which the curve rises quickly as shown by line a-b in FIG. 5.

In the forwarding operation of the input rod 20 described above, the vacuum pressure transmitted from the first port 28 to the front annular chamber 45A acts on the front face of the valve portion 34a facing the front annular chamber 45A of the valve cylinder 10. On the other hand, the atmospheric pressure transmitted from the second port 29 to the rear annular chamber 45B through the communicating hole 47 acts on the back face of the valve portion 34a facing the rear annular chamber 45B of the valve cylinder 10. Therefore, the valve portion 34a is pushed in a direction so that the valve portion 34a can be seated on the vacuum pressure introducing valve seat 30 by not only the set load of the valve spring 36 but also the difference in pressure between the front and the rear annular chambers 45A, 45B. According to the pushing operation conducted by the difference in pressure, the set load of the valve spring 36 can be reduced. Accordingly, the set load of the input return spring 41 for pushing the input rod 20 in the backward direction can be reduced. As a result, by a relatively small initial operation input, the jumping characteristic can be obtained. Therefore, ineffective strokes of the brake master cylinder M and the wheel brake can be quickly eliminated, and the response property of the wheel brake can be enhanced.

In the above state, since the seal lip 37 on the outer circumference of the valve portion 34a is bent backward and tightly contacted with the inner circumferential face of the valve cylinder 10, the contacting force with the inner circumferential face can be enhanced by the difference in pressure between the front and the rear annular chamber 45A, 45B. Accordingly, the airtightness between both the annular chambers 45A, 45B can be ensured.

After the elastic piston 22 has come into contact with the reaction force piston 17, a portion of the reaction force of the output rod 25 is fed back to the input rod 20 through the elastic piston 22. Therefore, it is possible for a driver to feel an intensity of the output of the output rod 25. Therefore, the output of the output rod 25 is increased by a ratio of boosting operation, which is determined by a ratio of the pressure receiving area of the operation piston 15 contacting with the elastic piston 22 to the pressure receiving area of the reaction force piston 17, as shown by line b-c shown in FIG. 5.

After the difference in pressure between the vacuum pressure chamber 2 and the operation chamber 3 has reached the critical boosting force point c at which the difference in pressure becomes maximum, as shown by line c-d in the drawing, the output of the output rod 25 becomes a sum of the maximum trust, which is generated by the difference in pressure of the booster piston 4, and the operation input given to the input rod 20.

When the force given to the brake pedal P is removed so as to release the braking state of the vehicle, first, the input rod 20 and the valve piston 18 are retreated by a force generated by the input return spring 41. In accordance with that, as shown in FIG. 4, while the valve piston 18 is seating the atmosphere introducing valve seat 31 on the valve body 34, the valve piston 18 greatly separates the valve body 34 from the vacuum pressure introducing valve seat 30. Therefore, the operation chamber 3 is communicated with the vacuum pressure chamber 2 through the second port 29 and the first port 28. As a result, the introduction of atmosphere into the operation chamber 3 is stopped. On the other hand, the air in the operation chamber 3 is sucked into the vacuum pressure source V through the vacuum pressure chamber 2. Since no difference in pressure is made at this time, the booster piston 4 is retreated by an elastic force of the booster return spring 27, and the operation of the master cylinder M is released. Then, the booster piston 4 and the input rod 20 are returned to the state of recess shown in FIGS. 1 and 2.

In this connection, the annular attaching bead portion 34b in the valve body 34 is tightly held by the holding portions 35Ab, 35Bb, the diameters of which are smaller than the inner diameter of the valve cylinder 10, formed in a pair of valve holders 35A, 35B attached to the inner circumferential face of the valve cylinder 10. Therefore, the diameter of the attaching bead portion 34b can be made smaller than the inner diameter of the valve cylinder 10 in the same manner as the valve portion 34a. Accordingly, it is possible to reduce the attaching area of the attaching bead portion 34b as small as possible, and the airtightness can be enhanced. Since the seal member 43 closely contacting with the inner circumferential face of the valve cylinder 10 is attached to the engaging portion 35Bc of the rear valve holder 35B, the airtightness between both the holders 35A, 35B and the valve cylinder 10 can be ensured. Due to the foregoing, leakage of the atmosphere and vacuum pressure from the periphery of the attaching bead portion 34b can be positively prevented.

Further, when the diameter of the attaching bead portion 34b is made smaller than the inner diameter of the valve cylinder 10 in the same manner as the valve portion 34a, the length of the expanding cylinder portion 34c can be shortened, and the valve body 34 can be made compact.

Next, the second embodiment of the present invention shown in FIG. 6 will be explained below.

In this second embodiment, the cylindrical connecting portion 35Ac, which is engaged with the outer circumference of the front half portion of the engaging portion 35Bc of the rear valve holder 35B and also engaged with the inner circumferential face of the valve cylinder 10, is integrally connected with the flange portion 35Aa of the front valve holder 35A. The annular recess portion 50 and the annular protruding portion 51, which are elastically engaged with each other, are respectively formed in one and the other of the engaging faces of the connecting portion 35Ac and the engaging portion 35Bc. Except for the above points, the constitution of this second embodiment is substantially the same as the embodiment described before. Therefore, like reference characters are used to indicate like parts in FIG. 6, and the explanations are omitted here.

While the attaching bead portion 34b of the valve body 34 is being held between the holding portions 35Ab, 35Bb of the front and the rear valve holder 35A, 35B, the connecting portion 35Ac of the front valve holder 35A is engaged with the engaging portion 35Bc of the rear valve holder 35B. Due to-the foregoing, the annular recess portion 50 and the annular protruding portion 51 are elastically engaged with each other, and both the valve holders 35A, 35B are connected, so that a small assembling body composed of three components including the valve body 34 can be composed. Therefore, when this small assembling body is inserted into the valve cylinder 10, the control valve 38 can be easily assembled and the assembling property can be enhanced. Further, in the front valve holder 35A, since the cylindrical connecting portion 35Ac reinforces the flange portion 35Aa and enhances the rigidity of the holding portion 35Ab, the attaching bead portion 34b can be more strongly held in cooperation with the rear valve holder 35B.

It should be noted that the present invention is not limited to the above specific embodiment. Variations may be made without departing from the spirit and scope of the present invention. For example, the vacuum pressure booster B may be of the tandem type in which a pair of booster pistons, one is arrange in the front and the other is arranged at the rear, are connected with the same valve cylinder.

As described above, according to the first aspect of the present invention, there is provided a vacuum pressure booster having: a booster shell; a booster piston accommodated inside the booster shall and partitioning the interior of the booster shell into a front side vacuum pressure chamber communicating with a vacuum pressure source and a rear side operation chamber; a valve cylinder communicating with the booster piston, the valve cylinder including: a valve piston fitted into the valve cylinder to be slidable in a forward and rearward direction of the valve cylinder; an input rod coupling with the valve piston at a front end thereof; a control valve switching communication of the operation chamber with the vacuum pressure chamber and with air in accordance with a forward and rearward movement of the input rod between the valve piston and the valve cylinder; and an input return spring for pushing the input rod backward, and the control valve including: an annular vacuum pressure introducing valve seat formed in the valve cylinder; an atmosphere introducing valve seat formed in the valve piston and arranged inside the vacuum pressure introducing valve seat; a valve body including: an annular attaching bead portion airtightly attached to the valve cylinder; an expansion cylinder portion extending in the axial direction from the attaching bead portion; and an annular valve portion communicating with a forward end portion of the expansion cylinder portion and opposed to the vacuum pressure introducing valve seat and the atmosphere introducing valve seat so as to seat thereon; and a valve spring for pushing the valve portion so as to seat on the vacuum pressure introducing valve seat and the atmosphere introducing valve seat, wherein a first port communicating with the vacuum pressure chamber is opened on the outer circumferential side of the vacuum pressure introducing valve seat, a second port communicating with the operation chamber is opened between the vacuum pressure introducing valve seat and the atmosphere introducing valve seat in such a manner that the inner circumferential side of the valve portion is communicated with the atmosphere, the attaching bead portion is tightly held by a pair of cylindrical holding portions formed in a pair of valve holders attached to the valve cylinder, and the diameter of the holding portion is smaller than the inner diameter of the valve cylinder. Therefore, an attaching area of the attaching bead portion can be made as small as possible and the airtightness can be enhanced. When the diameter of the attaching bead portion is reduced to be a size smaller than the inner diameter of the valve cylinder in the same manner as that of the valve portion, the expansion cylinder portion of the valve body can be shortened and the valve body can be made compact.

According to the second aspect of the present invention, in addition to the first aspect, there is provided a vacuum pressure booster, wherein at least one of the pair of valve holders is engaged on the inner circumferential face of the valve cylinder through a seal member. Therefore, it is possible to ensure the airtightness between a pair of valve holders and the valve cylinder. The attaching portion of the attaching bead portion has a high airtightness, and further a leakage of the atmosphere and vacuum pressure from the periphery of the attaching bead portion can be positively prevented.

According to the third aspect of the present invention, in addition to the first or the second aspect, there is provided a vacuum pressure booster, wherein a cylindrical connecting portion engaging with an outer circumferential face of one valve holder having the holding portion for holding an inner circumferential face of the attaching bead portion is integrally formed in the other valve holder having the holding portion for holding an outer circumferential face of the attaching bead portion. Therefore, while the attaching bead portion is being held between the holding portions of the pair of valve holders, the connecting portion of one valve holder is engaged on the outer circumferential face of the other valve holder. Due to the foregoing, a small assembling body including three components of both the valve holders and the valve body is composed. When this small assembling body is inserted into the valve cylinder, the control valve can be easily assembled, that is, the assembling property can be enhanced.

According to the fourth aspect of the present invention, in addition to the third aspect, there is provided a vacuum pressure booster, wherein a recessing and a protruding portion elastically engaged with each other are formed on respective engaging faces between the pair of valve holders. Therefore, when the pair of valve holders are engaged with each other, the recessing and the protruding portion are automatically engaged with each other, so that both the holders can be connected. Therefore, the small assembling body including the three components can be easily composed. Accordingly, the assembling property can be further enhanced.

According to the fifth aspect of the present invention, in addition to one of the first to the fourth aspect, there is provided a vacuum pressure booster, wherein the valve portion is slidably fitted on the inner circumferential face of the valve cylinder, a forward annular chamber and a rear annular chamber are formed in the valve cylinder, the forward annular chamber is communicated with the first port and the rear annular chamber is communicated with the second port, a forward annular chamber is closed by the front face of the valve portion when the valve portion is seated on the vacuum pressure introducing valve seat, and a back face of the valve portion is facing to a rear annular chamber. Therefore, the input rod is advanced while resisting a set load of the input return spring, and the atmosphere introducing valve seat is separated from the valve portion of the valve body, and when the valve portion is seated on the vacuum pressure introducing valve seat, the vacuum pressure transmitted from the first port to the forward annular chamber acts on the front face of the valve portion facing the forward annular chamber. On the other hand, on the back face of the valve portion facing the rear annular chamber of the valve cylinder, the atmospheric pressure transmitted from the second port to the rear annular chamber acts. Therefore, the valve portion is pushed to a valve seating direction so as to seat on the vacuum pressure introducing valve seat by not only the set load of the valve spring but also a difference in the atmosphere between the front portion and the rear annular chamber. Therefore, the set load of the valve spring can be reduced by an intensity of the pushing force generated by the above difference in the atmospheric pressure. According to that, it is possible to reduce the set load of the input return spring to push the input rod backward. Therefore, the initial operation load of the input rod can be reduced.

What is claimed is:

1. A vacuum pressure booster comprising:
   a booster shell;
   a booster piston accommodated inside the booster shell and partitioning the interior of the booster shell into a front side vacuum pressure chamber communicating with a vacuum pressure source and a rear side operation chamber;
   a valve cylinder communicating with the booster piston, the valve cylinder including:
      a valve piston fitted into the valve cylinder to be slidable in a forward and rearward direction of the valve cylinder;
      an input rod coupling with the valve piston at a front end thereof;
      a control valve switching communication of the operation chamber with the vacuum pressure chamber and with air in accordance with a forward and rearward movement of the input rod between the valve piston and the valve cylinder; and
      an input return spring for pushing the input rod backward, and the control valve including:
         an annular vacuum pressure introducing valve seat formed in the valve cylinder;
         an atmosphere introducing valve seat formed in the valve piston and arranged inside the vacuum pressure introducing valve seat;
         a valve body including: an annular attaching bead portion airtightly attached to the valve cylinder; an expansion cylinder portion extending in the axial direction from the attaching bead portion; and an annular valve portion communicating with a forward end portion of the expansion cylinder portion and opposed to the vacuum pressure introducing valve seat and the atmosphere introducing valve seat so as to seat thereon; and
         a valve spring for pushing the valve portion so as to seat on the vacuum pressure introducing valve seat and the atmosphere introducing valve seat,
   wherein a first port communicating with the vacuum pressure chamber is opened on the outer circumferential side of the vacuum pressure introducing valve seat,
   a second port communicating with the operation chamber is opened between the vacuum pressure introducing valve seat and the atmosphere introducing valve seat in such a manner that the inner circumferential side of the valve portion is communicated with the atmosphere, the attaching bead portion is tightly held between a pair of cylindrical holding portions formed in a pair of valve holders attached to the valve cylinder and engaging an inner circumferential face of the valve cylinder, an annular recess portion and an annular protruding portion of the pair of cylinder holding portions are elastically engaged with each other, and a diameter of the cylindrical holding portions is smaller than the inner diameter of the valve cylinder.

2. The vacuum pressure booster according to claim 1, wherein at least one of the pair of valve holders is engaged on an inner circumferential face of the valve cylinder through a seal member.

3. The vacuum pressure booster according to claim 1, wherein a cylindrical connecting portion engaging with an outer circumferential face of one valve holder having the holding portion for holding an inner circumferential face of the attaching bead portion is integrally formed in the other valve holder having the holding portion for holding an outer circumferential face of the attaching bead portion.

4. The vacuum pressure booster according to claim 2, wherein a cylindrical connecting portion engaging with an outer circumferential face of one valve holder having the holding portion for holding an inner circumferential face of the attaching bead portion is integrally formed in the other valve holder having the holding portion for holding an outer circumferential face of the attaching bead portion.

5. The vacuum pressure booster according to claim 3, wherein the annular recess portion and the annular protruding portion elastically engaged with each other are formed on respective engaging faces between the pair of valve holders.

6. The vacuum pressure booster according to claim 4, wherein the annular recess portion and the annular protruding portion elastically engaged with each other are formed on respective engaging faces between the pair of valve holders.

7. The vacuum pressure booster according to claim 1, wherein the valve portion is slidably filled on an inner circumferential face of the valve cylinder, a forward annular chamber and a rear annular chamber are formed in the valve cylinder, the forward annular chamber is communicated with the first port and the rear annular chamber is communicated with the second Port the forward annular chamber is closed by a front face of the valve portion when the valve portion is seated on the vacuum pressure introducing valve seat, and a back face of the valve portion is facing to the rear annular chamber.

8. The vacuum pressure booster according to claim 2, wherein the valve portion is slidably fitted on an inner circumferential face of the valve cylinder, a forward annular chamber and a rear annular chamber are formed in the valve cylinder, the forward annular chamber is communicated with the first port and the rear annular chamber is communicated with the second port, the forward annular chamber is closed by a front face of the valve portion when the valve portion is seated on the vacuum pressure introducing valve seat, and a back face of the valve portion is facing to the rear annular chamber.

9. The vacuum pressure booster according to claim 3, wherein the valve portion is slidably fitted on an inner circumferential face of the valve cylinder, a forward annular chamber and a rear annular chamber are formed in the valve cylinder, the forward annular chamber is communicated with the first port and the rear annular chamber is communicated with the second port, the forward annular chamber is closed by a front face of the valve portion when the valve portion is seated on the vacuum pressure introducing valve seat, and a back face of the valve portion is facing to the rear annular chamber.

10. The vacuum pressure booster according to claim 4, wherein the valve portion is slidably fitted on an inner circumferential face of the valve cylinder, a forward annular chamber and a rear annular chamber are formed in the valve cylinder, the forward annular chamber is communicated with the first port and the rear annular chamber is communicated with the second port, the forward annular chamber is closed by a front face of the valve portion when the valve portion is seated on the vacuum pressure introducing valve seat, and a back face of the valve portion is facing to the rear annular chamber.

11. The vacuum pressure booster according to claim 5, wherein the valve portion is slidably filled on an inner circumferential face of the valve cylinder, a forward annular chamber and a rear annular chamber are formed in the valve cylinder, the forward annular chamber is communicated with the first port and the rear annular chamber is communicated with the second port, the forward annular chamber is closed by a front face of the valve portion when the valve portion is seated on the vacuum pressure introducing valve seat, and a back face of the valve portion is facing to the rear annular chamber.

12. The vacuum pressure booster according to claim 6, wherein the valve portion is slidably fitted on an inner circumferential face of the valve cylinder, a forward annular chamber and a rear annular chamber are formed in the valve cylinder, the forward annular chamber is communicated with the first port and the rear annular chamber is communicated with the second port, the forward annular chamber is closed by a front face of the valve portion when the valve portion is seated on the vacuum pressure introducing valve seat, and a back face of the valve portion is facing to the rear annular chamber.

13. The vacuum pressure booster according to claim 1, wherein the cylindrical holding portions are positioned away from a valve cylinder wall to hold the attaching bead portion away from the valve cylinder.

14. The vacuum pressure booster according to claim 1, wherein the annular valve portion faces in a forward direction and is integrally formed with the expansion cylinder portion.

15. The vacuum pressure booster according to claim 1, wherein a cylindrical connecting portion of a front valve holder is integrally connected with a flange portion of the front valve holder.

16. The vacuum pressure booster according to claim 1, further comprising a cylindrical connecting portion of a front valve holder is engaged with an outer circumference of an engaging portion of a rear valve holder of the pair of valve holders.

17. The vacuum pressure booster according to claim 16, wherein the annular recess portion and the annular protruding portion are formed in engaging faces of a connecting portion and the engaging portion of the front valve holder and the rear valve holder, respectively, of the pair of valve holders.

18. The vacuum pressure booster according to claim 17, wherein the connecting portion is engaged with the valve cylinder.

19. The vacuum pressure booster according to claim 1, wherein the pair of cylindrical holding portions comprise an annular recess having an open forward end and an annular protruding portion extending rearward into the annular recess from the open forward end, and wherein the annular recess and the annular protruding portion comprise inner and outer circumferential surfaces which engage each other.

20. A vacuum pressure booster comprising:
a booster shell;
a booster piston inside the booster shell and partitioning the interior of the booster shell into a front side vacuum pressure chamber communicating with a vacuum pressure source and a rear side operation chamber;
a valve cylinder communicating with the booster piston, the valve cylinder including:
a valve piston fitted into the valve cylinder to be slidable in a forward and rearward direction of the valve cylinder;
an input rod coupling with the valve piston at a front end thereof;
a control valve switching communication of the operation chamber with the vacuum pressure chamber and with air in accordance with a forward and rearward movement of the input rod between the valve piston and the valve cylinder; and
an input return spring for pushing the input rod backward, and the control valve including:
an annular vacuum pressure introducing valve seat formed in the valve cylinder;
an atmosphere introducing valve seat formed in the valve piston and arranged inside the vacuum pressure introducing valve seat;
a valve body including: an annular attaching bead portion airtightly attabhed to the valve cylinder; an expansion cylinder portion extending in the axial direction from the attaching bead portion; and an annular valve portion communicating with a forward end portion of the expansion cylinder portion and opposed to the vacuum pressure introducing valve seat and the atmosphere introducing valve seat so as to seat thereon; and
a valve spring for pushing the valve portion so as to seat on the vacuum pressure introducing valve seat and the atmosphere introducing valve seat,
wherein a first port communicating with the vacuum pressure chamber is opened on the outer circumferential side of the vacuum pressure introducing valve seat,
a second port communicating with the operation chamber is opened between the vacuum pressure introducing valve seat and the atmosphere introducing valve seat in such a manner that the inner circumferential side of the valve portion is communicated with the atmosphere, and
the attaching bead portion is tightly held between a pair of cylindrical holding portions formed in a front valve holder and a rear valve holder, the front valve holder including a connecting portion that extends into a recess of the rear valve holder having a forward facing open end, whereby the connecting portion is positioned between the valve cylinder and an engaging portion of the rear valve holder.

21. A vacuum pressure booster comprising:
a booster shell;
a booster piston inside the booster shell and partitioning the interior of the booster shell into a front side vacuum pressure chamber communicating with a vacuum pressure source and a rear side operation chamber;
a valve cylinder communicating with the booster piston, the valve cylinder including:
a valve piston fitted into the valve cylinder to be slidable in a forward and rearward direction of the valve cylinder;
an input rod coupling with the valve piston at a front end thereof;
a control valve switching communication of the operation chamber with the vacuum pressure chamber and with air in accordance with a forward and rearward movement of the input rod between the valve piston and the valve cylinder; and
an input return spring for pushing the input rod backward, and the control valve including:
an annular vacuum pressure introducing valve seat formed in the valve cylinder;
an atmosphere introducing valve seat formed in the valve piston and arranged inside the vacuum pressure introducing valve seat;
a valve body including: an annular attaching bead portion airtightly attached to the valve cylinder; an expansion cylinder portion extending in the axial direction from the attaching bead portion; and an annular valve portion communicating with a forward end portion of the expansion cylinder portion and opposed to the vacuum pressure introducing valve seat and the atmosphere introducing valve seat so as to seat thereon; and
a valve spring for pushing the valve portion so as to seat on the vacuum pressure introducing valve seat and the atmosphere introducing valve seat,
wherein a first port communicating with the vacuum pressure chamber is opened on the outer circumferential side of the vacuum pressure introducing valve seat,
a second port communicating with the operation chamber is opened between the vacuum pressure introducing valve seat and the atmosphere introducing valve seat in such a manner that the inner circumferential side of the valve portion is communicated with the atmosphere, and
the attaching bead portion is tightly held between a pair of cylindrical holding portions formed in a front valve holder and a rear valve holder, the front valve holder including a connecting portion that is positioned between the valve cylinder and an engaging portion of the rear valve holder,
wherein the front valve holder and the rear valve holder include an annular protruding portion and an annular recess portion, respectively, which are elastically engaged with each other.

* * * * *

UNITED STATES PATENT AND TRADEMARK OFFICE
CERTIFICATE OF CORRECTION

PATENT NO. : 7,549,711 B2 Page 1 of 1
APPLICATION NO. : 10/600834
DATED : June 23, 2009
INVENTOR(S) : S. Yatabe It is certified that error appears in the above-identified patent and that said Letters Patent is hereby corrected as shown below:

At column 15, line 39 (claim 20, line 27), "attabhed" should be --attached--.

Signed and Sealed this

Sixth Day of October, 2009

David J. Kappos
*Director of the United States Patent and Trademark Office*